UNITED STATES PATENT OFFICE.

FRITZ HOFMANN, CARL COUTELLE, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC-LIKE SUBSTANCE AND PROCESS OF MAKING SAME.

1,062,828.   Specification of Letters Patent.   Patented May 27, 1913.

No Drawing.   Application filed March 20, 1911. Serial No. 615,667.

*To all whom it may concern:*

Be it known that we, FRITZ HOFMANN, CARL COUTELLE, KONRAD DELBRÜCK, and KURT MEISENBURG, doctors of philosophy, chemists, citizens of the German Empire, residing at Elberfeld, Germany, have invented new and useful Improvements in New Caoutchouc-Like Substances and Processes of Making Same, of which the following is a specification.

By our earlier applications Ser. Nos. 578,607, 594,557, 578,608 and 588,173 the production of caoutchouc like substances is described, which may replace natural caoutchouc in its chemical and technical application. The processes for their production consist in converting into caoutchouc like substances methylerythrenes, erythrene and homologues thereof in which at least 2 atoms of H are substituted by methyl groups, such as di- tri- or tetramethylbutadiene.

It has now been found that by using mixtures of the starting materials mentioned in the above application (erythrene and its substitution products) new caoutchouc-like substances can be advantageously produced with properties different from those of the caoutchouc-like substances above referred to. Caoutchouc-like substances can be thus produced of a composite nature, made up of the polymerization products of the mixtures of erythrene hydrocarbons, and containing such products in most intimate intermixture. A more nearly homogeneous product and a more intimate intermixture can thus be produced by mixing the hydrocarbons before or during the polymerization reaction than is possible by mixing the individual and isolated caoutchoucs already formed.

In order to illustrate the new process more fully the following example is given, the parts being by weight:—A mixture of 100 parts of isoprene, 100 parts of cooled erythrene and 100 parts of beta-gamma-dimethylbutadiene is heated for 3 months in an autoclave to 70–75° C. A very tough and elastic substance is thus obtained made up of the caoutchouc-like substance together with any remaining unchanged hydrocarbons and byproducts. By treatment of this substance with steam such hydrocarbons and volatile byproducts, if present, can be removed and the caoutchouc-like substance obtained. The process proceeds in an analogous manner on using agents promoting the polymerization *e. g.* acids or acid salts, etc.

The new caoutchouc substances are white substances the color of which does not change. They swell up with chloroform or benzene to white hyaline substances from which the liquid can be poured off. They are free from protein substances, which are always contained in the natural caoutchouc and play an important part in it with regard to the elasticity of the natural caoutchouc. They form ozonids being thick oils, nitrosites and brom addition products. These ozonids, nitrosites and brom addition products differ with the different composite caoutchouc products, and correspond to these different products, and indirectly to the particular mixtures of hydrocarbons of which the composite caoutchoucs are polymerization products. Thus the product produced as above described from a mixture of erythrene, isoprene and beta-gammadimethylerythrene forms an ozonid or a mixture of ozonids which upon decomposition with water yields a mixture of oxygen-containing derivatives among which succinic aldehyde, lavulinic aldehyde, and acetonyl acetone are found.

We claim:—

1. The process of producing a caoutchouc-like substance which comprises polymerizing a mixture of more than two erythrene hydrocarbons.

2. The process of producing a caoutchouc-like substance which comprises polymerizing a mixture of erythrene hydrocarbons including erythrene and a plurality of other erythrene hydrocarbons.

3. The process of producing a caoutchouc-like substance which comprises polymerizing a mixture of erythrene hydrocarbons including isoprene and a plurality of other erythrene hydrocarbons.

4. The process of producing a caoutchouc-like substance which comprises polymerizing a mixture of erythrene hydrocarbons including diisopropenyl and a plurality of other erythrene hydrocarbons.

5. The process of producing a caoutchouc-like substance which comprises polymerizing a mixture of erythrene, isoprene and diisopropenyl.

6. The process of producing a caoutchouc-like substance which comprises polymerizing a mixture of erythrene hydrocarbons including unsubstituted-, mono-methyl-, and poly-methyl-erythrenes.

7. As a new product a caoutchouc-like substance comprising the caoutchouc-like polymerization product of a mixture of more than two erythrene hydrocarbons.

8. As a new product a caoutchouc-like substance comprising the caoutchouc-like polymerization product of a mixture of erythrene hydrocarbons including erythrene and a plurality of other erythrene hydrocarbons which product forms a nitrosite, ozonid, and brom-addition product, the ozonid upon decomposition with water yielding succinic aldehyde, and a plurality of other oxygen-containing decomposition products.

9. As a new product a caoutchouc-like substance comprising the caoutchouc-like polymerization product of a mixture of erythrene hydrocarbons including isoprene and a plurality of other erythrene hydrocarbons, which product forms a nitrosite, ozonid and brom-addition product, the ozonid upon decomposition with water yielding lavulinic aldehyde and a plurality of other oxygen-containing decomposition products.

10. As a new product a caoutchouc-like substance comprising the caoutchouc-like polymerization product of a mixture of erythrene hydrocarbons including diisopropenyl and a plurality of other erythrene hydrocarbons which product forms a nitrosite, ozonid, and brom-addition product, the ozonid upon decomposition with water yielding acetonyl-acetone and a plurality of other oxygen-containing decomposition products.

11. As a new product a caoutchouc-like substance comprising the caoutchouc-like polymerization product of a mixture of erythrene hydrocarbons including unsubstituted-, mono-methyl-, and poly-methyl-erythrenes which product forms a nitrosite, ozonid, and brom-addition product, the ozonid upon decomposition with water yielding succinic aldehyde and a plurality of other methyl-substituted derivatives of succinic aldehyde.

12. As a new product the caoutchouc-like polymerization product of a mixture of erythrene, isoprene and beta-gamma-dimethyl-erythrene which product forms a nitrosite, ozonid and brom-addition product, the ozonid upon decomposition with water yielding a mixture of oxygen-containing derivatives including succinic aldehyde, lavulinic aldehyde and acetonyl-acetone, substantially as described.

In testimony whereof we have hereunto set our hands in the presence of two subscribing witnesses.

FRITZ HOFMANN. [L. S.]
CARL COUTELLE. [L. S.]
KONRAD DELBRÜCK. [L. S.]
KURT MEISENBURG. [L. S.]

Witnesses:
ALFRED HENKEL,
A. POSER.